June 30, 1964　　　A. E. ROANE　　　3,138,934
THERMOELECTRIC HEATING AND COOLING SYSTEM FOR VEHICLES
Filed Nov. 19, 1962　　　2 Sheets-Sheet 1
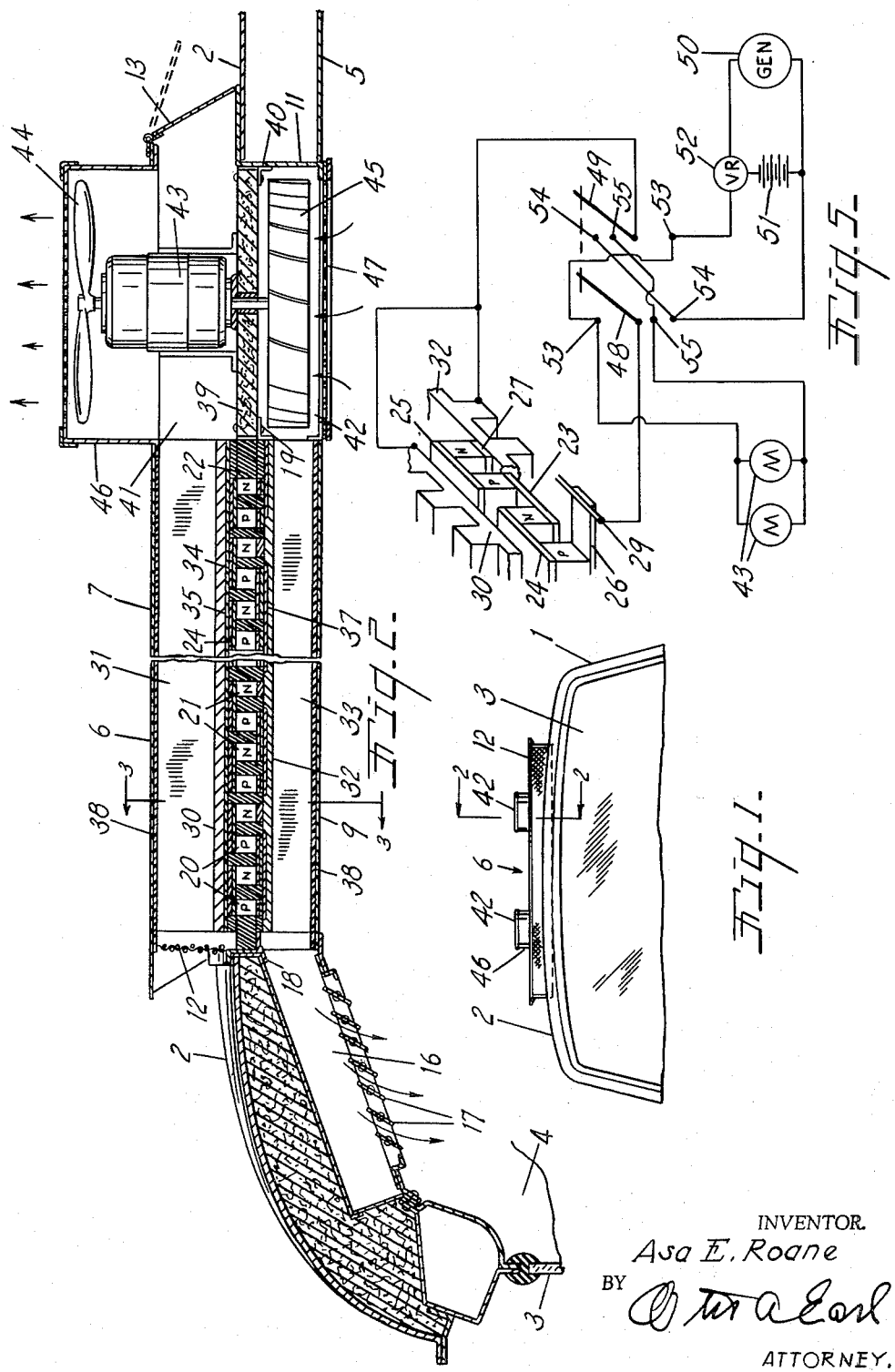
INVENTOR.
Asa E. Roane
BY
ATTORNEY.

United States Patent Office 3,138,934
Patented June 30, 1964

3,138,934
THERMOELECTRIC HEATING AND COOLING SYSTEM FOR VEHICLES
Asa E. Roane, Cadillac, Mich., assignor to Kysor Industrial Corporation, Cadillac, Mich.
Filed Nov. 19, 1962, Ser. No. 238,524
13 Claims. (Cl. 62—3)

This invention relates to improvements in thermoelectric heating and cooling system for vehicles. The principal objects of this invention are:

First, to provide a reversible thermoelectric heating and cooling system with heat transfer fins part of which are positioned interiorly and part exteriorly of the top wall of an automotive vehicle to selectively heat and cool the interior of the vehicle.

Second, to provide a relatively thin heat pump assembly with fins on opposite sides thereof and fans for circulating interior and exterior air over opposite fins, the fans being arranged to be automatically adjusted and assisted by air flow caused by movement of the vehicle on which the assembly is mounted.

Third, to provide a thermoelectric heat pump for vehicles with a reversible switch, the thermoelectric elements and connections thereto being sealed in plastic, to reverse the flow of current through the pump and reverse its heat pumping action.

Fourth, to provide a thermoelectric heat pump that is easily mechanically encapsulated in a thin package and assembled with air circulating fans for assembly within an opening cut in the roof of a vehicle.

Other objects and advantages of the invention will be apparent from a consideration of the following description and claims. The drawings, of which there are two sheets, illustrate a highly practical form of the heat pump of the invention installed in an automobile.

FIG. 1 is a fragmentary front elevation view of an automobile with the heat pump mounted in the roof thereof.

FIG. 2 is a fragmentary vertical cross sectional view taken along the plane of the line 2—2 in FIG. 1.

FIG. 5 is a schematic wiring diagram of the electrical connections and switch for reversibly actuating the heat pump.

Figure 3:
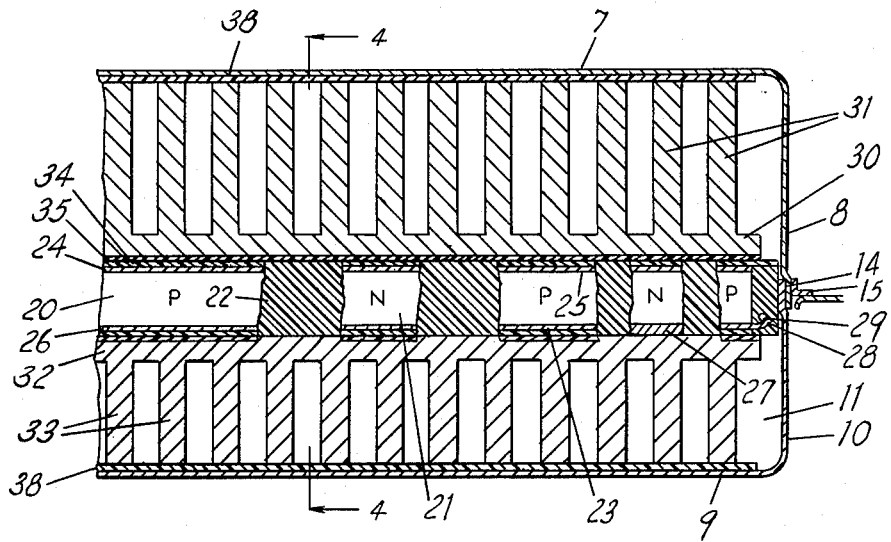
FIG. 3 is a fragmentary transverse cross sectional view taken along the plane of the line 3—3 in FIG. 2.

An automobile 1 having a top 2 and windshield 3 coacting to enclose the passenger compartment 4 is conventionally illustrated. The automobile may be either a truck or passenger car. The inner lining or ceiling of the passenger compartment is indicated at 5 spaced from the inside of the top 2. The heat pump generally indicated at 6 is installed in a generally rectangular hole in the top 2 and ceiling 5.

The heat pump is enclosed in a sheet metal case having an upper part 7 with side walls 8 and a bottom part 9 with side walls 10 and back wall 11. The front and back of the top part are open and project above the top 2. A grill 12 covers the open front and a door or damper 13 is mounted in the open rear end of the top part and arranged to swing closed by gravity. The two parts of the case are suitably joined together as at 14 and an angle molding 15 supports the case from the top 2. Within the vehicle and between the top 2 and ceiling 5, the bottom part of the case opens forwardly to a discharge duct 16. The duct 16 is mounted across the front of the passenger compartment and has louvers 17 discharging downwardly along the inside of the windshield.

Mounted centrally within the case and supported in part by angle clips 18 and 19 across the front and middle of the case and by support from the bottom part 9 is the thermoelectric heat pump. The pump consists of spaced transversely extending bars or modules of semi-conductor material. Alternate bars 20 are known as P-type and consist of material such as Bismuth Telluride which emits heat at its positive side when subjected to electric current while absorbing heat at its negative side. The intervening bars or modules 21 are of N-type semi-conducting material such as Cerium Sulfide which have the property of emitting heat at their negative side when subjected to electric current while absorbing heat at their positive side. The modules are enclosed or encapsulated on their sides and ends in a block or slab 22 of thermal and electrical insulation such as poly urethane foam insulation but as will be more particularly described are exposed on their top and bottom surfaces.

Figure 4:
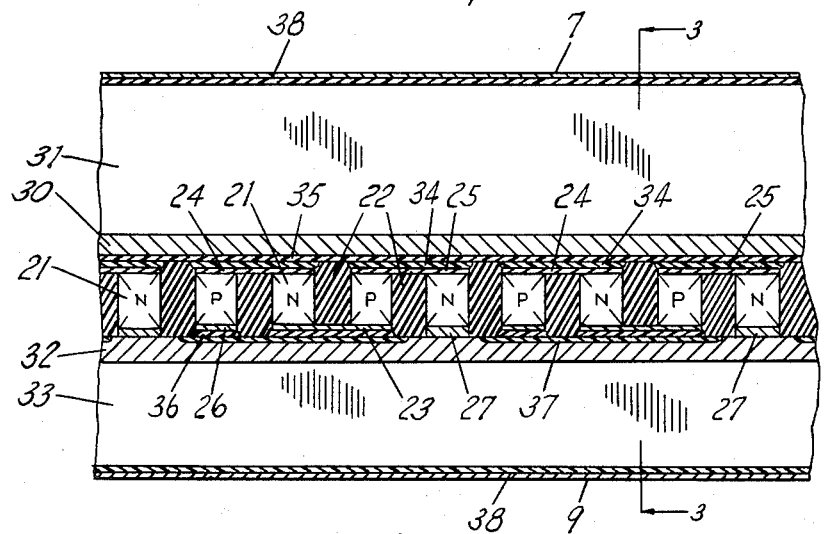
FIG. 4 is a fragmentary enlarged cross sectional view taken along the plane of the line 4—4 in FIG. 3.

Adhered along the bottom of the block 22 and lapped in electrical and heat conductive contact with alternate pairs of adjacent P units and N units are a first series of transverse bus plates 23 (see FIG. 4). The opposite or upper sides of the connected P and N units are electrically connected to adjacent units by bus plates 24 and 25 thus providing an electric series through two pairs of P and N units. The end units of each series which are P and N units are lapped in electrical contact with narrow bus plates 26 and 27. The length of the series or the number of P and N units therein can be varied to match the resistance of the series to the applied voltage. The narrow bus plates 26 project from one end of their associated P units in contact ears 28 which are electrically connected by a wire 29 (see FIG. 3).

Positioned on each face of the assembled P and N units or modules and the insulating block 22 are finned aluminum plates. The upper plate 30 has upwardly projecting fins 31 while the lower plate 32 has downwardly projecting fins 33. The upper bus plates 24 and 25 are electrically insulated from the upper plate 30 by coatings of epoxy resin 34. In addition the lower surface of the plate 30 may be anodized to aluminum oxide as at 35 to further insulate the parts. However, the epoxy and the anodizing do not materially reduce the heat conductivity between the plate 30 and the modules 20 and 21. Strips 36 of the resin electrically insulate the end P units and bus plates 26 of each series from the lower plate 32 but the bus strips 27 on the N units at the opposite end of each series are in direct electrical contact with the lower plate 32. Strips of anodizing 37 on the lower plate assist the electrical insulation of the epoxy strips 36. Electrically insulating plates on coatings 38 insulate the edges of the fins from the walls of the case.

The finned plates 30 and 32 and the assembly of the modules in the slab 22 terminate forwardly of the rear walls 11 and damper 13. A partition 39 of rigid load bearing insulating material such as wood is secured to angle cross pieces 19 and 40 to divide the case into upper or an outer chamber 41 and inner chamber 42. The partition supports two motors 43 with upright shafts that drive upwardly discharging fan blades 44 and forwardly discharging blower wheels 45. The fan blades are in short stacks 46 projecting and opening upwardly from the upper chamber 41 while the blower wheels 45 draw air centrally through holes 47 in the bottom wall 9 from the passenger compartment and discharge it forwardly between the fins 33 to the discharge duct 16. The propellors 44 are used to draw air through the exterior grille 12 when the auto is stopped at which time the gate or damper 13 closes. When the auto is moving forwardly, air rammed in the grille passes naturally out through the damper and also tends to turn the propellors thus reducing the load on the motors 43 which are shunt wound.

The semi-conductor modules are selectively and reversibly connectable to the electrical system of the automobile as shown in the wiring diagram of FIG. 5. A two pole, three position switch has its arms 48 and 49 connected to the wire 29 and the lower finned plate 32 respectively. The generator 50, battery 51 and voltage regulator 52 of the auto are connected to reversing contacts 53 and 54 of the switch. A special high output generator or alternator of about six kilowatt capacity will be necessary to obtain normal heating and cooling. With presently known thermoelectric semi-conductors this will supply 18,000 B.t.u. per hour of cooling. In the up position of the arms the arm 49 also closes or connects terminals 54 and 55 to energize the motors 43. In the down position the arm 48 does the same. The lower and upper finned plates 30 and 32 are desirably electrically connected together. The upper sides of the P-type modules and N-type modules are thus connected together to form a hot junction at a floating or intermediate potential when the switch is up. The lower sides of the N-type modules 21 and the P-type modules 20 are at opposite polarity at the ends of each series of modules through the bus wire 29 and the lower plate 30 and form cold junctions to absorb heat from the lower finned plate 25 and air forced between the fins 26 by the blowers. The assembly thus acts as a cooling air conditioning system with heat dissipated to the outside air by the top fins 33.

When the switch is swung down to heating position the arm 49 closes or connects terminal 53 to the lower bus plates 27 through the lower finned plate 32. The arm 48 engages the contact 54 which connects the bus plates 26 to the other side of the source. The upper sides of the thermoelectric modules are then cool junctions and absorb heat from the outside air which is pumped or transferred to the lower hot junctions and the lower finned plate for transfer to the passenger compartment.

What is claimed as new is:

1. A thermoelectric heat pump for vehicles comprising,
   a casing adapted to be supported half in and half out of the exterior top wall of a vehicle and having an open front with an opening in its back wall in its top part with a freely pivoted damper in the back opening,
   means including an inner ceiling in said vehicle forming an outlet duct from the lower part of said open front end to a discharge opening directed downwardly along the inside of the windshield of the vehicle,
   an upper finned plate positioned in the upper part of said casing and electrically insulated therefrom with upwardly projecting fins extending longitudinally toward said open front,
   a lower finned plate in the lower portion of said casing and insulated therefrom with downwardly projecting fins extending longitudinally toward the open front end of the lower portion,
   a series of alternately arranged elongated P-type and N-type thermoelectric semi-conductor module bars arranged in spaced insulated relation to each other and extending transversely of said casing between said finned plates,
   upper and lower strips of electrically conductive material arranged on the opposed inner sides of said finned plates and extending thereacross in substantial heat conducting relation therewith,
   said material electrically connecting said module bars in plural series of plural pairs of P units and N units,
   a first conductor electrically connecting one side of said series of units,
   a second conductor including one of said finned plates and electrically connecting the other side of said series of units,
   selective switch means arranged to connect said conductors to alternatively opposite poles of a source of current,
   first fan means arranged to draw air through the open front end of the upper portion of said case,
   stacks arranged to vertically direct the discharge of said fan means,
   other blower means arranged to recirculate air forwardly from within said vehicle through the fins in the lower portion of said case and said duct, and
   shunt wound motor means connected to drive said fan means and blower means and electrically connected to be energized through said switch means in either selected position of the switch.

2. A thermoelectric heat pump for vehicles comprising,
   a casing adapted to be supported half in and half out of the exterior top wall of a vehicle and having an open front with an opening in its back wall in its top part with a freely pivoted damper in the back opening,
   an upper finned plate positioned in the upper part of said casing with upwardly projecting fins extending longitudinally toward said open front,
   a lower finned plate in the lower portion of said casing with downwardly projecting fins extending longitudinally toward the open front end of the lower portion,
   a series of alternately arranged elongated P-type and N-type thermoelectric semi-conductor module bars arranged in spaced insulated relation to each other and extending transversely of said casing between said finned plates,
   upper and lower strips of electrically conductive material arranged on the opposed inner sides of said finned plates and extending thereacross in substantial heat conducting relation therewith,
   said material electrically connecting said module bars in plural series of pairs of P units and N units,
   a first conductor electrically connecting one side of said series of units,
   a second conductor including one of said finned plates and electrically connecting the other side of said series of units,
   selective switch means arranged to connect said conductors to alternatively opposite poles of a source of current,
   first fan means arranged to draw air through the open front end of the upper portion of said case,
   stacks arranged to vertically direct the discharge of said fan means,
   other blower means arranged to recirculate air forwardly from within said vehicle through the fins in the lower portion of said case and said duct,
   and shunt wound motor means connected to drive said fan means and said blower means and electrically connected to be energized through said switch means in either selected position of the switch.

3. A thermoelectric heat pump for vehicles comprising
   a casing adapted to be supported half in and half out of the exterior top wall of a vehicle and having an open front with an opening in its back wall in its top part with a freely pivoted damper in the back opening,
   an upper finned plate positioned in the upper part of said casing and electrically insulated therefrom with upwardly projecting fins extending longitudinally toward said open front,
   a lower finned plate in the lower portion of said casing and insulated therefrom with downwardly projecting fins extending longitudinally toward the open front end of the lower portion,
   a series of alternately arranged elongated P-type and N-type thermoelectric semi-conductor module bars arranged in spaced insulated relation to each other and in heat conducting relation between said finned plates,
   upper and lower bus plates of electrically conductive material arranged on the opposed inner sides of said finned plates and extending thereacross in substantial heat conducting relation therewith, said bus plates electrically connecting said module bars in series of plural pairs of P units and N units, a first conductor electrically connecting one side of said series of units, a second conductor including one of said finned plates and electrically connecting the other side of said series of units, selective switch means arranged to connect said conductors to alternatively opposite poles of a source of current, first fan means arranged to draw air through the open front end of the upper portion of said case, other blower means arranged to recirculate air through the fins in the lower portion of said case from the interior of said vehicle, and shunt wound motor means connected to drive said fan means and said blower means and electrically connected to be energized through said switch means in either selected position of the switch.

4. A thermoelectric heat pump for vehicles comprising a casing adapted to be supported part in and part out of the exterior top wall of a vehicle and having an open front with an opening in its back wall in its top part and a freely pivoted damper in the back opening, an upper finned plate positioned in the upper part of said casing and electrically insulated therefrom with upwardly projecting fins extending longitudinally toward said open front, a lower finned plate in the lower portion of said casing and insulated therefrom with downwardly projecting fins extending longitudinally toward the open front end of the lower portion, a series of alternately arranged elongated P-type and N-type thermoelectric semi-conductor module bars arranged in spaced insulated relation to each other and in heat conducting relation between said finned plates, upper and lower bus plates of electrically conductive material arranged on the opposed inner sides of said finned plates and extending thereacross in substantial heat conducting relation therewith, said bus plates electrically connecting said module bars in series of pairs of P units and N units, a first conductor electrically connecting one side of said series of units, a second conductor electrically connecting the other side of said series of units, selective switch means arranged to connect said conductors to alternatively opposite poles of a source of current, first fan means arranged to draw air through the open front end of the upper portion of said case, other blower means arranged to recirculate air through the fins in the lower portion of said case from the interior of said vehicle, and shunt wound motor means connected to drive said fan means and said blower means and electrically connected to be energized through said switch means in either selected position of the switch.

5. A thermoelectric heat pump for vehicles comprising a casing adapted to be supported part in and part out of an exterior wall of a vehicle and having an open front and a back wall with an opening in its outer part with a freely pivoted damper in the back opening, an outer finned plate positioned in the outer part of said casing with outwardly projecting fins extending longitudinally toward said open front, an inner finned plate in the inner portion of said casing with inwardly projecting fins extending longitudinally toward the open front end of the inner portion, a series of alternately arranged elongated P-type and N-type thermoelectric semi-conductor module bars arranged in spaced insulated relation to each other and extending transversely between said finned plates, inner and outer bus plates of electrically conductive material arranged on the opposed inner sides of said finned plates and in substantial heat conducting relation therewith, said bus plates electrically connecting the major portion of the surfaces of said module bars in plural series of plural pairs of P units and N units, a first conductor electrically connecting one side of said series of units, a second conductor including one of said finned plates and electrically connecting the other side of said series of units, selective switch means arranged to connect said conductors to alternatively opposite poles of a source of current, first fan means arranged to draw air through the open front end of the outer portion of said case and discharge it through openings other than the opening in the back of said outer part, blower means arranged to recirculate air forwardly from within said vehicle through the fins in the inner portion of said case, and shunt wound motor means connected to drive said fan means and said blower means and electrically connected to be energized through said switch means in either selected position of the switch.

6. A thermoelectric heat pump for vehicles comprising, a casing adapted to be supported half in and half out of an exterior wall of a vehicle and having an open front and a back with an opening in its back wall in its outer part with a freely pivoted damper in the back opening, an outer finned plate positioned in the outer part of said casing with outwardly projecting fins extending longitudinally toward said open front, an inner finned plate in the inner portion of said casing with inwardly projecting fins extending longitudinally toward the open front end of the inner portion, a series of alternately arranged elongated P-type and N-type thermoelectric semi-conductor module bars arranged in spaced insulated relation to each other and extending between said finned plates, inner and outer bus plates of electrically conductive material arranged on the opposed inner sides of said finned plates and in substantial heat conducting relation therewith, said bus plates electrically connecting the major portion of the surfaces of said module bars in plural pairs of P units and N units, a first conductor electrically connecting one side of said pairs of units.

a second conductor electrically connecting the other side of said pairs of units, selective switch means arranged to connect said conductors to alternatively opposite poles of a source of current, first fan means arranged to draw air through the open front end of the outer portion of said case and discharge it through openings other than the opening in the back of said outer part, blower means arranged to recirculate air from within said vehicle through the fins in the inner portion of said case, and motor means connected to drive said fan means and said blower means and electrically connected to be energized through said switch means in either selected position of the switch.

7. A thermoelectric heat pump for vehicles comprising, a casing adapted to be supported in an exterior wall of a vehicle and having an outer part open at the front and back to the exterior of the vehicle with a freely pivoted damper in the back opening, an outer finned plate positioned in the outer part of said casing with outwardly projecting fins extending longitudinally toward said open front, an inner finned plate in the inner portion of said casing with inwardly projecting fins extending longitudinally toward an opening in one end of the inner portion of the casing, a series of alternately arranged elongated P-type and N-type thermoelectric semi-conductor module bars arranged in spaced insulated relation to each other and extending in heat conducting relation between said finned plates, means electrically connecting said module bars in series of pairs of P units and N units, a first conductor electrically connecting one side of said series of units, a second conductor electrically connecting the other side of said series of units, selective switch means arranged to connect said conductors to alternatively opposite poles of a source of current, first fan means arranged to draw air through the open front end of the outer portion of said case, blower means arranged to recirculate air from said vehicle through the fins in the inner portion of said case, and motor means connected to drive said fan means and said blower means and electrically connected to be energized through said switch means in either selected position of the switch.

8. A thermoelectric heating and cooling system for vehicles comprising, a casing adapted to be positioned in a hole in a wall of the vehicle and projecting on both sides thereof, a pair of finned heat conducting plates positioned in said casing with their fins projecting oppositely to the inner and outer sides of the casing, the outer part of said casing being arranged to direct flow of exterior air over the outer fins incident to movement of the vehicle, means for inducing circulation of interior air in the vehicle over the inner finned plate, a series of alternating elongated P-type and N-type thermoelectric module bars positioned with their opposite faces in heat conducting relation between said finned plates and substantially coextensive with the area of said plates, said module bars having their lateral sides electrically and thermally insulated from each other, and means including a selectively operable switch arranged to electrically connect one face of adjacent pairs of said module bars while connecting the opposite faces of the P-type module bars to one polarity of a power source and the N-type module bars to the other polarity of the source, said electrical connecting means electrically contacting substantially the entire areas of the faces connected.

9. A thermoelectric heating and cooling system for vehicles comprising, a casing adapted to be positioned in the vehicle, a pair of finned heat conducting plates positioned in said casing with their fins projecting oppositely to the inner and outer sides of the casing, the outer part of said casing being arranged to direct flow of exterior air over the outer fins incident to movement of the vehicle, means for inducing circulation of interior air in the vehicle over the inner finned plate, a series of alternating elongated P-type and N-type thermoelectric module bars positioned with their opposite faces in heat conducting relation between said finned plates, said module bars having their lateral sides electrically and thermally insulated from each other, and means including a selectively operable switch arranged to alternatively electrically connect one face of adjacent pairs of said module bars while connecting the opposite faces of the P-type module bars to one polarity of a power source and the N-type module bars to the other polarity of the source, said electrical connecting means electrically contacting substantially the entire areas of the faces connected.

10. A thermoelectric heat pump comprising, a casing adapted to be supported part in and part out of the exterior top wall of an enclosure and having openings in opposite walls in its outer part, an outer finned plate positioned in the outer part of said casing and electrically insulated therefrom with outwardly projecting fins extending longitudinally between said openings, an inner finned plate in the inner portion of said casing and insulated therefrom with inwardly projecting fins extending longitudinally toward an opening formed in the end of the inner portion, a series of alternately arranged elongated P-type and N-type thermoelectric semi-conductor module bars arranged in spaced insulated relation to each other and extending in heat conducting relation between said finned plates, means electrically connecting said module bars in plural series of plural pairs of P units and N units, a first conductor electrically connecting one side of said series of units, a second conductor including one of said finned plates and electrically connecting the other side of said series of units, selective switch means arranged to connect said conductors to alternatively opposite poles of a source of current, first fan means arranged to draw air through the open end of the outer portion of said case, other means arranged to recirculate air from said enclosure through the fins in the inner portion of said case, and motor means connected to drive said fan means and said recirculating means and electrically connected to be energized through said switch means in either selected position of the switch, said electrical connecting means electrically contacting substantially the entire area of the faces connected.

11. A thermoelectric heat pump comprising, a casing adapted to be supported part in and part out of the exterior top wall of an enclosure and having openings in opposite walls in its outer part, an outer finned plate positioned in the outer part of said casing with outwardly projecting fins extending longitudinally between said openings, an inner finned plate in the inner portion of said casing with inwardly projecting fins extending longitudinally toward an opening formed in the end of the inner portion, a series of alternately arranged elongated P-type and N-type thermoelectric semi-conductor module bars arranged in spaced insulated relation to each other and extending in heat conducting relation between said finned plates, means electrically connecting said module bars in plural pairs of P-units and N-units, a first conductor electrically connecting one side of said pairs of units, a second conductor electrically connecting the other side of said pairs of units, selective switch means arranged to connect said conductors to alternatively opposite poles of a source of current, first fan means arranged to draw air through the open end of the outer portion of said case, other means arranged to recirculate air from said enclosure through the fins in the inner portion of said case, and motor means connected to drive said fan means and said recirculating means and electrically connected to be energized through said switch means in either selected position of the switch, said electrical connecting means electrically contacting substantially the entire area of the faces connected.

12. In a vehicle having a passenger compartment with spaced inner and outer top walls and a windshield at the front end of the compartment, a thermoelectric heat pump supported by said outer wall with upper and lower finned heat conducting plates secured to its opposite sides, the fins of said plates extending longitudinally of the vehicle with the fins of the upper plate exposed to the exterior of said outer wall and the fins of the lower plate located between said walls, means forming a circulating duct between said walls and surrounding the fins on said lower plate and having a discharge opening directed downwardly along the inside of said windshield, electrical connections arranged to selectively and oppositely activate said heat pump, and a blower arranged to circulate air from the interior of said compartment through said duct and said discharge opening.

13. A thermoelectric heat pump comprising a casing adapted to be supported part in and part out of the exterior top wall of an enclosure and having openings in opposite walls in its outer part, an outer finned plate positioned in the outer part of said casing and electrically insulated therefrom with outwardly projecting fins extending longitudinally between said openings, an inner finned plate in the inner portion of said casing and insulated therefrom with inwardly projecting fins extending longitudinally toward an opening formed in the end of the inner portion, a series of alternately arranged elongated P-type and N-type thermoelectric semi-conductor module bars arranged in spaced insulated relation to each other and extending in heat conducting relation between said finned plates, means electrically connecting said module bars in plural series of plural pairs of P units and N units, a first conductor electrically connecting one side of said series of units, a second conductor including one of said finned plates and electrically connecting the other side of said series of units, selective switch means arranged to connect said conductors to alternatively opposite poles of source of current, first fan means arranged to draw air through the open end of the outer portion of said case, other means arranged to recirculate air from said enclosure through the fins in the inner portion of said case, and motor means connected to drive said fan means and said recirculating means and electrically connected to be energized through said switch means in either selected position of the switch, said electrical connecting means contacting substantially the entire area of the faces connected.

References Cited in the file of this patent

UNITED STATES PATENTS

| | | |
|---|---|---|
| 2,790,377 | Pryne | Apr. 30, 1957 |
| 2,799,143 | Weigel | July 16, 1957 |
| 2,922,284 | Danielson | Jan. 26, 1960 |
| 2,959,018 | Hwang | Nov. 8, 1960 |
| 3,019,609 | Pietsch | Feb. 6, 1962 |
| 3,040,538 | Alsing | June 26, 1962 |
| 3,040,539 | Gaugler | June 26, 1962 |
| 3,085,405 | Frantti | Apr. 16, 1963 |